United States Patent
Lange de Oliveira (10) Patent No.: US 11,752,484 B2
(45) Date of Patent: Sep. 12, 2023

(54) APPARATUS AND METHOD FOR ANALYZING REACTIONS

(71) Applicant: hte GmbH the high throughput experimentation company, Heidelberg (DE)

(72) Inventor: Armin Lange de Oliveira, Heidelberg (DE)

(73) Assignee: HTE GMBH THE HIGH THROUGHPUT EXPERIMENTATION, Heidelberg (DE)

( * ) Notice: Subject to any disclaimer, the term of this patent is extended or adjusted under 35 U.S.C. 154(b) by 0 days.

(21) Appl. No.: 17/278,741

(22) PCT Filed: Sep. 23, 2019

(86) PCT No.: PCT/EP2019/075513
§ 371 (c)(1),
(2) Date: Mar. 23, 2021

(87) PCT Pub. No.: WO2020/064624
PCT Pub. Date: Apr. 2, 2020

(65) Prior Publication Data
US 2022/0040661 A1 Feb. 10, 2022

(30) Foreign Application Priority Data
Sep. 24, 2018 (EP) .................................... 18196194

(51) Int. Cl.
*B01J 19/00* (2006.01)

(52) U.S. Cl.
CPC .. *B01J 19/0046* (2013.01); *B01J 2219/00286* (2013.01); *B01J 2219/00306* (2013.01);
(Continued)

(58) Field of Classification Search
CPC .... B01J 19/00; B01J 19/0046; B01J 2219/00; B01J 2219/00274; B01J 2219/00277;
(Continued)

(56) References Cited

U.S. PATENT DOCUMENTS

| 9,228,985 B2 * | 1/2016 | Lange De Oliveira ..................... B01J 19/0093 |
| 2002/0182128 A1 * | 12/2002 | Carnahan ............. B01J 19/0046 422/600 |

(Continued)

FOREIGN PATENT DOCUMENTS

| DE | 10361003 B3 | 7/2005 |
| WO | 1999064160 | 12/1999 |

(Continued)

OTHER PUBLICATIONS

International Search Report for PCT/EP2019/075513 dated Oct. 30, 2019, 4 pgs.

*Primary Examiner* — Natasha E Young
(74) *Attorney, Agent, or Firm* — Lowenstein Sandler LLP (57) ABSTRACT

The invention proceeds from an apparatus for analyzing reactions, comprising a starting material distributor and at least two reactors which are connected in parallel and are each connected via a connecting conduit to an outlet of the starting material distributor. To set the inflow, a pressure regulator and a restrictor are installed in each connecting conduit between the starting material distributor and the reactors or an outlet conduit in which a restrictor and a pressure regulator are installed branches off from each connecting conduit. The invention further relates to a method for analyzing reactions in such an apparatus.

16 Claims, 4 Drawing Sheets

(52) U.S. Cl.
CPC ............... *B01J 2219/00389* (2013.01); *B01J 2219/00477* (2013.01); *B01J 2219/00587* (2013.01); *B01J 2219/00594* (2013.01); *B01J 2219/00702* (2013.01); *B01J 2219/00747* (2013.01)

(58) Field of Classification Search
CPC .... B01J 2219/00279; B01J 2219/00281; B01J 2219/00286; B01J 2219/00306; B01J 2219/00351; B01J 2219/00389; B01J 2219/00477; B01J 2219/00583; B01J 2219/00585; B01J 2219/00587; B01J 2219/00594; B01J 2219/0068; B01J 2219/00702; B01J 2219/00718; B01J 2219/00745; B01J 2219/00747
See application file for complete search history.

(56) References Cited

U.S. PATENT DOCUMENTS

2004/0131515 A1    7/2004   Alexanian et al.
2016/0121291 A1*   5/2016   Moonen ............... B01J 19/0046
                                                          422/108

FOREIGN PATENT DOCUMENTS

| WO | 2006/107187 A1 | 10/2006 |
|---|---|---|
| WO | 2009145614 | 12/2009 |
| WO | 2012178132 | 12/2012 |
| WO | 2014062056 | 4/2014 |
| WO | 2015080572 | 6/2015 |

* cited by examiner

APPARATUS AND METHOD FOR ANALYZING REACTIONS

The present application is a national stage entry under 35 U.S.C. § 371 of International Application No. PCT/EP2019/075513, now WO 2020/064624, filed on Sep. 23, 2019, which claims priority to European Patent Application Serial No. 18196194.7, filed on Sep. 24, 2018. The entire contents of which are incorporated by reference in their entirety.

The invention proceeds from an apparatus for analyzing reactions, comprising a starting material distributor and at least two reactors which are connected in parallel and are each connected via a connecting conduit to an outlet of the starting material distributor. The invention further relates to a method for analyzing reactions in such an apparatus.

Apparatuses for analyzing reactions having at least two reactors connected in parallel can, for example, be used for examining reaction parameters such as pressure or temperature. However, such an apparatus is particularly useful for testing catalysts, in which in each case the same starting material volume flow is fed to each reactor of the apparatus in order to obtain comparable reaction conditions and thus be able to examine the influence of the catalyst on the reaction.

Such an apparatus having fixed-bed reactors arranged in parallel and a device which distributes the starting material streams largely uniformly over the reactors is described, for example, in WO-A 99/64160. In order to obtain a uniform distribution of the feed streams over the reactors, restrictors by means of which the flow resistance is increased are used. Examples of restrictors are capillaries, microchannels and orifice plates in a channel. Thus, for example, WO-A 2015/080572 discloses the use of microchannels in the inlet to the individual reactors.

A disadvantage of the restrictors known from WO-A 99/64160 and WO-A 2015/080572 is that they do not allow any variable setting of the flow resistance and for this reason no individual setting of the starting material flows to the reactors arranged in parallel is possible. In order to vary the volume flow of the starting material streams, it is necessary to replace the restrictors. Furthermore, precise setting of the starting material flows is not possible because small differences in the geometry of the restrictors, which also cannot be prevented due to the method of manufacture, lead to small deviations in the volume flows.

In order to be able to adjust the starting material flows, WO-A 2009/145614 discloses a liquid distributor having capillaries as restrictors for distributing starting material streams over the reactors, in which the capillaries can be heated in order to be able to vary the flow resistance. However, these thermally adjustable restrictors have the disadvantage that they have to be calibrated regularly and are very complicated in terms of switching technology. In addition, the heatable capillaries also have restrictions in terms of possible process parameters, in particular the temperature and the settable range of the volume flow as a function of the process pressure, so that replacement with other capillaries may also be necessary here when the desired volume flow cannot be set using the existing capillary.

If regulation of an individual flow is effected by changing the temperature of a capillary, the temperature dependence of the viscosity has to be known. For complex hydrocarbon mixtures in particular, for example vacuum gas oil, the temperature dependence of the viscosity has to be determined experimentally. As an alternative, there is only the possibility of determining the flow in each case and empirically adapting the temperature of the capillary, but this requires a large outlay in terms of regulation and measurement. Furthermore, the measurement of small flows at high temperatures (>180° C.) is possible to only a limited extent, if at all. A further disadvantage is that a change in or adaptation of the temperature-controlled capillaries is complicated since these have to be brought into good thermal contact with the individual heating system.

The effects of different temperatures of a capillary are also generally small because the viscosity of, for example, ideal gases changes only as a function of the square root of the absolute temperature. The viscosity of ideal liquids changes exponentially with the inverse absolute temperature (Arrhenius-Andrade relationship), so that, depending on the liquid and the temperature, the flow change can range from very small to very large.

Furthermore, the temperature cannot be changed at will because, for example, the melting point, boiling point or decomposition point of a medium have to be taken into account. Operation of a capillary at relatively high temperature can also lead to accelerated formation of deposits in the capillary and a consequent increase in the flow resistance of the capillary, so that a further increase in temperature becomes necessary. This results in a back-coupling which can lead to premature failure of the system.

WO-A 2014/062056 discloses the use of a pressure regulator which utilizes an auxiliary fluid by means of whose reference pressure the flow cross section for the reaction medium flowing through the pressure regulator is set for setting the pressure in the individual reactors at the outlet of each reactor. The pressure of the auxiliary fluid is set by use of two restrictors of which at least one is able to be temperature controlled. The pressure in the reactor can be set by means of the pressure regulator adjoining the reactor. When the reactor pressure changes, the flow through the reactor is simultaneously also changed when using restrictors in the inlet. A disadvantage is that reactor pressure and flow cannot be regulated independently of one another.

It is therefore an object of the present invention to provide an apparatus for analyzing reactions, in which it is possible to set the pressure difference individually with the required precision for each restrictor upstream of the reactors under operating conditions and which does not require any permanent calibration effort and is, in particular, also suitable for high temperatures.

The object is achieved by an apparatus for analyzing reactions, comprising a starting material distributor and at least two reactors which are connected in parallel and are each connected via a connecting conduit to an outlet of the starting material distributor, wherein a pressure regulator and a restrictor are installed in each connecting conduit between the starting material distributor and the reactors in order to set the inflow or an outlet conduit in which a restrictor and a pressure regulator are installed branches off from each connecting conduit.

The combination of restrictor and pressure regulator makes improved fine matching of the fluid flows into the individual reactors possible. In particular, the fluid stream which flows through the restrictor can be regulated without, as in the case of the regulation by setting the temperature of the capillaries known from the prior art, the fluid flow being set without permanent calibration. In addition, particularly when using pressure regulators having a high accuracy and short settling times, rapid changes in the starting material stream conveyed through the pressure regulator and restrictor are possible. Furthermore, in the case of regulation by setting the temperature, it is necessary to take account of the melting point, boiling point or decomposition point of a medium, while in the case of individual flow control by means of the admission pressure and exit pressure these aspects do not have to be taken into account, so that a wider working range of the control is obtained.

The alternative configuration with an outlet conduit in the connecting conduit, where a restrictor and a pressure regulator are installed in the outlet conduit, allows setting of the inflow into the reactor by part of the starting material stream which is fed in being discharged. This has the advantage that no further pressure increase is brought about on the inflow side into the reactor and, furthermore, the starting material stream can be set with greater accuracy in the case of a large pressure difference between reactor and outlet channel.

Suitable pressure regulators are, for example, membrane pressure regulators, piston pressure regulators, bellows pressure regulators or else proportional overpressure valves. These can be spring-loaded, dome-loaded or both. Furthermore, the pressure regulators can have one or more stages. Depending on the position of the pressure regulator, admission pressure regulators or exit pressure regulators are used, with it also being possible to use electronically controlled pressure regulators. However, preference is given to using spring-loaded membrane or piston pressure regulators which can be directly acting or serve for dome control of membrane pressure reducers, since these do not require any further dedicated regulating devices. Dome-loaded pressure reducers in particular have the advantage that they can be operated even at very high temperatures, i.e. temperatures up to 300° C., and at less high pressures even up to 700° C., and thus allow pressure regulation of vapors of high-boiling substances. Here, fine control of the dome pressure outside the heated region can be carried out while the actual membrane pressure regulator is supplied with the dome pressure in the hot region by means of a tube connection. For small throughputs in particular, dome-loaded membrane admission pressure regulators as are described in, for example, WO-A 2012/178132 are suitable.

The apparatus is suitable both for reactions to which liquid starting material streams are fed and for those to which gaseous starting material streams are fed. Apart from the addition of liquid starting material streams or gaseous starting material streams, it is also possible to feed in liquid and gaseous starting material streams, with the gaseous starting material streams and the liquid starting material streams each being fed via separate feed conduits to the reactor. In this case, it is also possible to bring the feed conduits together at a connecting point and feed the starting material mixture of liquid and gaseous starting material formed in the connecting point to the reactor. In the case of more than two starting materials, at least one starting material can be gaseous and all other starting materials can be liquid or at least one starting material can be liquid and all other starting materials can be gaseous, with in each case only liquid or only gaseous starting materials being fed via a feed conduit to the connecting point or the reactor. The apparatus is particularly suitable for analyzing reactions in the gas phase, to which the starting materials are fed in gaseous form.

In one embodiment of the invention, the pressure regulator is installed between the starting material distributor and the restrictor. In this embodiment, the pressure regulator is an exit pressure regulator in order to set the pressure difference over the restrictor and, as a result, the volume flow of the starting material stream through the restrictor.

As an alternative, it is also possible for the pressure regulator to be installed between the restrictor and the reactor. In this embodiment, the pressure regulator is an admission pressure regulator in order to set the pressure difference over the restrictor and, as a result, the volume flow of the starting material stream through the restrictor.

When an outflow conduit with pressure regulator and restrictor are provided, use is likewise made of an admission pressure regulator when the pressure regulator is arranged downstream of the restrictor in the flow direction and an exit pressure regulator with the pressure regulator is positioned upstream of the restrictor in the flow direction.

In particular when particularly small starting material streams are desired, as is desirable in parallel testing, preference is given to the pressure regulator being arranged downstream of the restrictor in the flow direction and using an admission pressure regulator.

The pressure difference occurring at the restrictor is controlled by means of the pressure regulator. This pressure difference determines the starting material flow at a given flow resistance in the restrictor. In this way, the starting material stream fed to the reactor can thus be set precisely by means of the pressure regulator and deviations in the starting material flow which bring about a change in the pressure difference in the restrictor can be corrected quickly. The pressure drop over the restrictor is generally given by the reactor pressure and the pressure in the supply conduit. The pressure in the supply conduit arises from the pressure drop over all restrictors produced when the total volume flow flows through and is thus dependent on the total volume flow, the viscosity of the flowing medium and the geometry of the restrictors. At a given flow resistance, which is dependent on the medium used and the geometry of the restrictor, the pressure difference along a restrictor is set by means of the pressure regulator and the volume flow through the restrictor is thus regulated. Here, flow resistance is the variable which describes the ratio of pressure difference to volume flow in noncompressible fluids and is constant for laminar flow. In the case of compressible fluids, it relates to the ratio of a difference of the squares of inflow pressure and outflow pressure to volume flow normalized to atmospheric pressure and for laminar flow is likewise a constant which is, for example in the case of tube flow, determined by internal diameter and length of the tube and by the viscosity of the medium. As an alternative, it is also possible to set the pressure in the starting material distributor, for example by use of an overpressure valve or a pressure regulator, and thus obtain a constant pressure on the inlet side into the restrictor, so that the flow in the reactor can be set at a predetermined pressure in the feed upstream and also downstream of the restrictor. The pressure in the reactor is preferably controlled by means of a pressure regulator which is positioned downstream of the reactor in the flow direction. This can, for example, also be connected to the analysis unit.

As restrictors, it is possible to use all restrictors known to those skilled in the art. The term restrictors refers here to components which have a high flow resistance and thus produce a high pressure drop. In order to obtain a uniform distribution of the fluid stream over the reactors connected in parallel, it is necessary for the pressure drop produced in the restrictor to be greater than the pressure drop over the other plant parts. Suitable restrictors are, in particular, capillaries, microstructured components, orifice plates or nozzles. Particular preference is given to using capillaries as restrictors. This has the advantage that the starting material flow through the restrictor configured as a capillary can be determined in a simple way by means of the Hagen-Poiseuille law for laminar tube flow. As an alternative, it is also possible to check and adapt the starting material flow by analysis of the reaction mixture leaving the reactor in the analysis unit.

In order to be able to feed a second starting material stream or an inert stream for diluting the reaction media in each case into the reactors, it is advantageous for the reactors to be connected to a further distributor. It is also possible, when the reactors are connected to a starting material distributor and a further distributor, to introduce a starting material via each distributor which is then mixed in the reactor and reacted. When more than two streams of material are to be fed to the reactor, it is also possible to provide more than two distributors which are connected to the reactors, with a different stream of material being fed to each distributor and then being distributed via the distributor over the reactors. To set the flow of material fed to the reactors via the distributors, a restrictor is positioned in each case between the further distributor or further distributors and each reactor. A restrictor in each case between the further distributor and the reactors connected to the further distributor is sufficient when, in particular, the stream of material fed into the reactors via the further distributor does not have to be set and small fluctuations also do not have any discernible influence on the reaction. This is the case when, in particular, the stream of material fed in via the further distributor is very much larger than the stream of material supplied via the starting material distributor or in the case of an inert gas stream being fed in via the further distributor, when the dilution brought about by the inert gas stream of the starting materials introduced via the starting material distributor does not have any influence on the reaction.

When precise setting of the stream of material fed in via the further distributor or the further distributors is required, for example in the case of a further starting material being fed in via the further distributor(s), it is also advantageous to install a pressure regulator between the further distributor and each restrictor or between each restrictor located downstream of the further distributor and the following reactor. As pressure regulators, it is possible here to use the same pressure regulators as are also used in the connecting conduits between the starting material distributor and the reactors.

Apart from the introduction of starting materials and inert streams, the introduction of moderators for catalytic reactions is also of significance. The moderators do not behave as inerts but do not react in the actual target reaction but instead generally react reversibly with the catalyst by, for example, in the case of CO adsorbing it on the active component of the catalyst or in the case of ethyl chloride reacting it with the active component and reversibly forming a chloride. Here, properties of the catalyst are altered, and the amount of moderators introduced should be adapted for the specific catalyst in order to carry out the target reaction optimally. For this purpose, very precise amounts introduced have to be adhered to and these have to be able to be set variably for each catalyst. In such cases, preference is given to the flow of moderator-comprising gas being able to be set precisely and variably.

When a plurality of starting materials or at least one starting material and at least one inert stream are fed in via a plurality of distributors and feed conduits, it is also possible to bring together the individual feed conduits upstream of the reactor to form a joint feed conduit into the reactor, so that the individual streams of material are introduced into the reactor via the joint feed conduit. In this case, the pressure regulator can also be positioned in the joint feed conduit downstream of the point at which the streams of material are brought together. When an outlet conduit is additionally provided before introduction into the reactor, this can branch off from the joint feed conduit either upstream of the pressure regulator in the flow direction of the streams of material or downstream of the pressure regulator in the flow direction of the streams of material. Here, preference is given to the outlet conduit branching off from the joint feed conduit downstream of the pressure regulator. This makes improved control of the flows or the respective pressures possible because the pressure regulators are connected in series and not in parallel.

When a pressure regulator is installed in the joint feed conduit, restrictors are preferably installed in all feed conduits for the starting material streams and/or inert streams. Since the pressure regulator is in this embodiment positioned between the restrictors and the reactor, the pressure regulator is preferably an admission pressure regulator.

Particularly for carrying out screening studies, for example for the testing of catalysts, a large number of reactors is required. For this purpose, preference is given to the apparatus comprising from 2 to 80 reactors. Further preference is given to the reactor comprising from 4 to 50 reactors and in particular from 4 to 20 reactors. The maximum number of reactors is dependent, inter alia, on the volume of the individual reactors, the size of the components and the space available. In addition, it is necessary for the length of
the pipes connecting the reactors to the starting material distributor and optionally further distributors not to be made too different in order to prevent fluctuations in the flows of material to the individual reactors from occurring because of the different pressure drops due to the different length of the pipes. However, when the flows of material are measured using a suitable flow measurement apparatus directly before entry into the reactors or by means of inert streams downstream of the reactors, for example in the analysis unit, this pressure drop can be compensated for by appropriate setting of the pressure regulator in the connecting conduit between the starting material distributor or further distributor and reactor and the desired flow can be set.

When more reactions have to be carried out than is simultaneously possible when using one apparatus for a study, it is possible either to operate a number of apparatuses in parallel or carry out the experiments in succession in the same apparatus. In order to be able to carry out different reactions or to test various catalysts, it is particularly advantageous for the reactors to be able to be replaced. This allows simple charging of the reactors with another catalyst or the use of another reactor, for example having a different geometry, or even a different type of reactor.

Reactors which can be used in the apparatus of the invention are, in particular, continuously operated reactors, in particular tube reactors. Apart from tube reactors, it is also possible to use other types of reactor, for example backmixed reaction vessels such as stirred tank reactors, jet loop reactors or cascades and also combinations of optionally different or identical reactors, optionally with circulation.

The internal volume of the reactors is preferably from 0.1 to 500 ml, more preferably from 0.5 to 100 ml and in particular from 1 to 50 ml. Like the number of reactors, the size of the reactors is dependent on, inter alia, the space available. A further parameter for selection of the size of the reactors is the starting materials to be used or the properties of the reactions to be carried out, for example reaction rate and thus the residence time necessary in the reactor. In the case of slow reactions which require a correspondingly long residence time, this can be set via, for example, the length and the diameter of a continuously operated tube reactor.

For examination of catalysts or catalytically activated reactions, the catalyst is, for example, introduced in the form of a bed, suspension, solution or packing into the reactor. As an alternative, the catalyst can also be configured as a monolith with flow channels located therein. When a catalyst is comprised in the reactor, said catalyst in the form of the bed, suspension, solution, packing or monolith preferably takes up a volume which is from 0.1% to 100% of the reactor volume. Regardless of whether the catalyst is configured as a bed, packing or monolith, the catalytically active material can be introduced directly into the reactor or be in supported form. Suitable support materials are any material which is used for supported catalysts and is known to those skilled in the art. Suitable support materials are, for example, metal oxides, zeolites, ceramics or carbon and also mixtures thereof.

In order to be able to examine reactions which are carried out in the individual reactors of the apparatus, each reactor is preferably connected to an analysis unit.

As an alternative, it is also possible to collect the reaction mixture produced in the reactor in a storage vessel and analyze it at a later point in time. However, connecting each reactor to an analysis unit has the advantage that time-dependent studies on the course of the reaction can also be carried out.

Analysis units which can be used are firstly those by means of which physical data, for example pressure or temperature, can be measured and also those by means of which the components in the reaction mixture can be determined qualitatively and/or quantitatively. Suitable analysis units are, for example, those which operate using chromatographic methods, for example a gas chromatograph, a high performance liquid chromatograph (HPLC) or those which operate by a spectroscopic method, for example an infrared spectrometer. The use of different analysis units is also possible.

The apparatus is particularly suitable for studies of reactions in the gas phase. In such a method for analyzing reactions in an apparatus for analyzing reactions, gaseous starting materials are fed into each reactor via the starting material distributor, with the flow of the starting materials being regulated by means of the pressure regulators and the reaction product from each reactor being evaluated in the analysis unit.

Depending on the parameters to be examined, the apparatus allows the reactors to be supplied with different volume flows of starting material and/or provided with different partial pressures of the starting materials. This makes it possible to examine the influence of different parameters such as composition of the reaction mixture, amount of moderator or residence time on the reaction. However, it is necessary, particularly when different catalysts are to be tested, for the same conditions to prevail in all reactors so as to discern the influence of the various catalysts on the reaction. For this purpose, it is necessary for the reactors all to be supplied with the same volume flow, the same composition and the same pressure. For such an examination of catalysts, each reactor is charged with a catalyst. Here, it is possible in each case to charge a plurality of reactors with the same catalyst in order to detect deviations in the test conditions or fluctuations in the course of the reaction. However, as an alternative, each reactor can be charged with a different catalyst.

The introduction of the starting materials can be effected jointly via the starting material distributor. In this case, the starting materials are mixed upstream of the starting material distributor and are then fed via the starting material distributor into the individual reactors. This is possible when, in particular, the starting materials react with one another only in the presence of a catalyst or only after introduction of energy, for example by means of an elevated temperature. When the starting materials begin to react with one another immediately on contact, it is advantageous to feed in one starting material via the starting material distributor and at least one further starting material via the further distributor. As an alternative, it is also possible to introduce diluent gases via the further distributor, for example in order to vary partial pressures. When the starting materials are fed in via different distributors, the diluent gas can then be fed in via a separate distributor or together with a starting material. When all starting materials are fed in via the starting material distributor, the diluent gas is preferably fed in via the further distributor.

Figure 1:
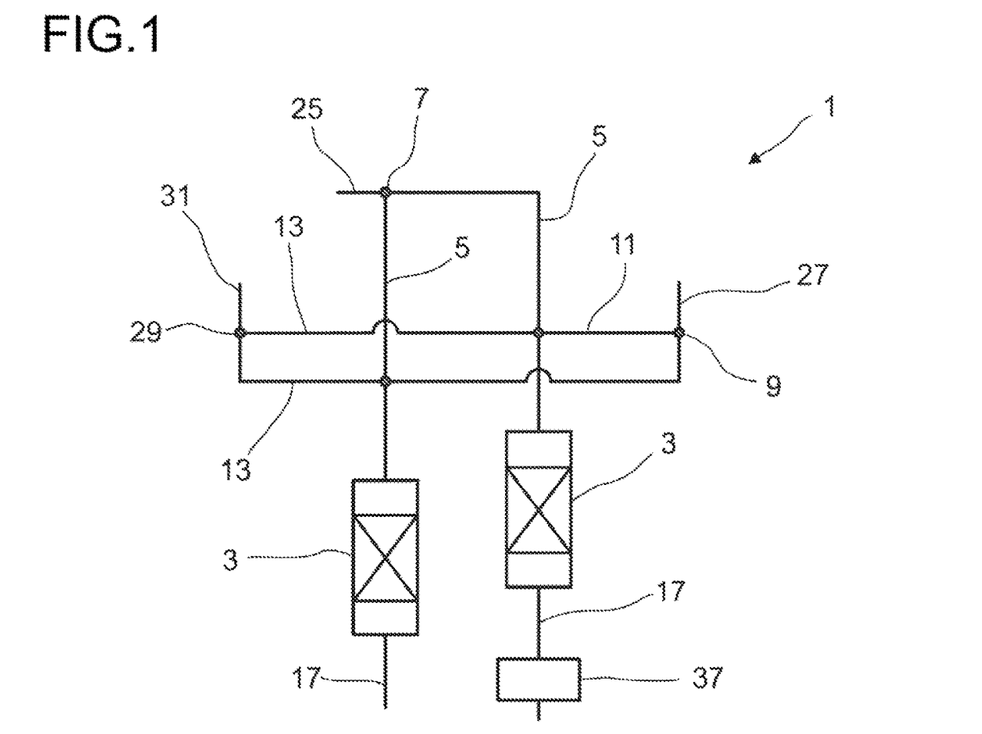
FIG. 1 a schematic depiction of an apparatus for analyzing reactions.

Embodiments of the invention are depicted in the figures and are explained in more detail in the following description. The figures show:

FIG. 1 shows a schematic depiction of an apparatus for analyzing reactions.

An apparatus for analyzing reactions 1 comprises at least two reactors 3 which are connected in parallel and are each connected via a connecting conduit 5 to a starting material distributor 7. When it is not possible to mix the starting materials to be fed into the reactor or when a variable starting material composition is to be obtained, a further distributor 9 via which further starting materials can be introduced is, as depicted here, provided. For this purpose, the further distributor 9 is connected via a further connecting conduit 11 to the reactor 3. The further connecting conduit 11 can, as shown here, open into the connecting conduit 5 by means of which the starting material distributor 7 is connected to the reactor 3 before entry into the reactor 3. As an alternative, it is also possible for both connecting conduits 5, 11 to open into the reactor 3 and the starting materials fed in via the connecting conduits 5, 11 to come into contact with one another only in the reactor 3. This is particularly useful when a reaction is triggered immediately on contact of the starting materials with one another.

The starting materials fed into the reactors 3 are preferably gaseous. However, it is also possible to introduce liquid starting materials.

In the embodiment depicted in FIG. 1, an outlet conduit 13 which branches off from the connecting conduit 5 is additionally provided. The outlet conduit 13 serves, in particular, for discharging part of the starting material, so that the flow can be regulated by discharge of part of the starting material from the process as a result of the starting material being added in an excess and such an amount of starting material that the desired amount is fed into the reactor 3 always being taken off via the outlet conduit 13. When introduction regulation is effected via the connecting conduit 5 or the further connecting conduit 11, the outlet conduit 13 can also be omitted.

The starting materials introduced via the connecting conduit 5 and optionally the further connecting conduit 11 are fed into the reactor 3 in which a chemical reaction occurs. The reactor 3 is preferably a continuously operated reactor, for example a tube reactor. When the apparatus is to be used for examining catalysts or for examining reactions which are catalytically activated, the reactor 3 is charged with a catalyst. In the case of a tube reactor, a catalyst bed 15 is usually introduced into the reactor 3 for this purpose. The starting materials fed into the reactor 3 then flow through the catalyst bed 15 and form a reaction mixture which comprises the reaction product, optionally by-products and optionally unreacted starting materials. When an inert gas is introduced into the reactor in order to dilute the reaction mixture, for example via the further distributor 9 or a third distributor (not shown here), the reaction mixture also comprises the inert gas since this does not react with the starting materials fed in. When a moderator-comprising gas is introduced into the reactor, the reactivity
of the catalyst changes and the reaction mixture comprises both unreacted or desorbed moderator and also reaction products of the moderator.

After flowing through the reactor 3, the reaction mixture leaves the reactor 3 through an offtake conduit 17. The offtake conduit 17 can either open into a vessel in which the reaction mixture is collected in order then to be passed to analysis at a later point in time or it is conducted directly to an analysis unit 37 so that an "on-line measurement", by means of which even short-term fluctuations in the course of the reaction can be detected, is carried out. For the analysis, use is made of an analysis unit in which the reaction mixture can be analyzed qualitatively and/or quantitatively, for example by chromatographic methods such as gas chromatography or high performance liquid chromatography or else by spectroscopic methods such as infrared spectroscopy, with combinations of different methods also being possible. The reaction mixture is usually fed to the analysis unit by means of a selection valve in order to be able to utilize the analysis unit for a number of reactors.

In order to feed the same starting materials to all reactors, the starting material distributor 7 is connected to a central starting material feed conduit 25 through which the starting materials are fed to the starting material distributor and, when a further distributor 9 is present, this is connected to a further central feed conduit 27 through which either further starting materials or else an inert gas are fed in and then, as described above, distributed in the further distributor 9 to the reactors 3. When an outlet conduit 13 is provided on each reactor 3, these preferably open into a collector 29. From the collector 29, the streams of material which have been collected and combined in the collector 29 are then removed from the process via a central outlet channel 31.

Figure 2:
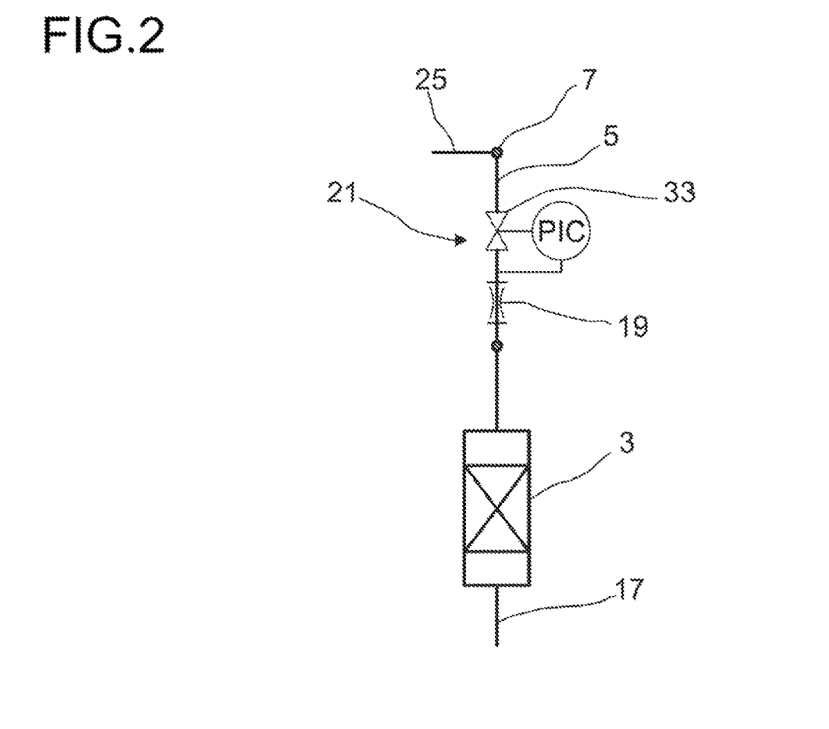
FIG. 2 a reactor of an apparatus for analyzing reactions with an exit pressure regulator for setting the flow, FIG. 3 a reactor of an apparatus for analyzing reactions with an admission pressure regulator for setting the flow, FIG. 4 a reactor of an apparatus for analyzing reactions with two starting material feed conduits, FIG. 5 a reactor of an apparatus for analyzing reactions with a pressure regulator in the outlet conduit, FIG. 6 a reactor of an apparatus for analyzing reactions with two starting material feed conduits in a further embodiment, FIG. 7 a reactor of an apparatus for analyzing reactions with two starting material feed conduits in a further embodiment.

In the apparatus, it is possible either to carry out a number of reactions simultaneously under the same conditions, in which case it is necessary, in particular, to supply all reactors with the same starting material volume flows at the same pressure, or under different conditions, for example in order to examine the influence of pressure and/or volume flow of a starting material of the reaction. In order to be able to set exactly the same volume flows at the same pressure or to be able to set different volume flows in a targeted manner, a restrictor and a pressure regulator are, in one embodiment, installed in the connecting conduit 5 between starting material distributor 7 and reactor 3. FIG. 2 here shows an embodiment having an exit pressure regulator and FIG. 3 shows an embodiment having an admission pressure regulator.

Figure 3:
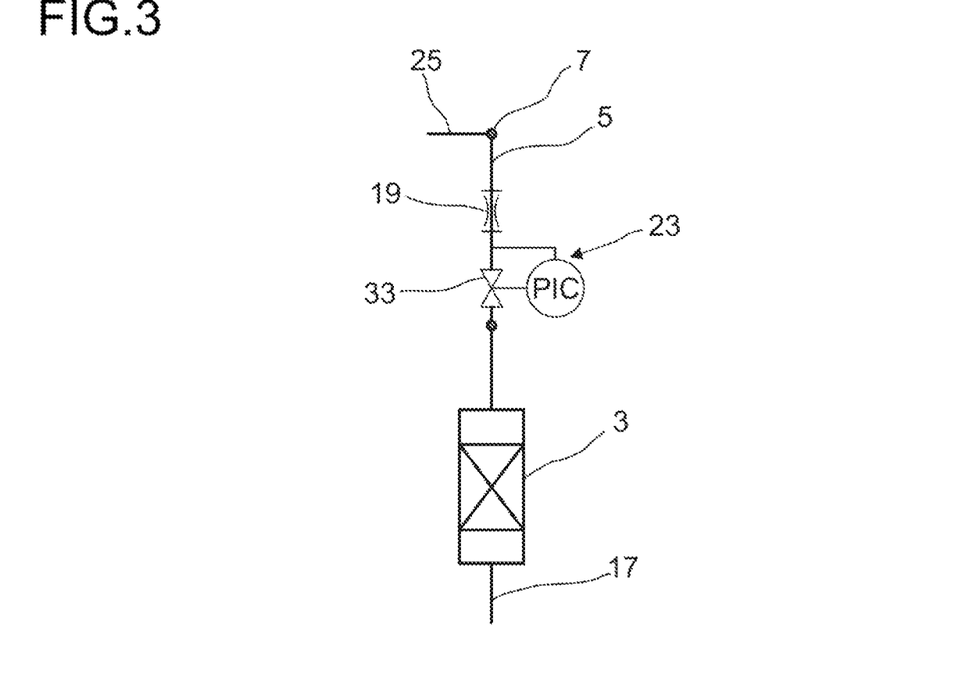

To simplify the depiction, only one reactor 3 is shown in each of the FIGS. 2 and 3. In the total apparatus having a plurality of reactors, each reactor 3 is connected in the same way to the starting material distributor 7. In contrast to the embodiment depicted in FIG. 1, the embodiments depicted in FIGS. 2 and 3 only have the starting material distributor 7. In this case, all the components fed to the reactor are introduced via the starting material distributor 7 into the reactors 3. For this purpose, the individual components are mixed upstream of the starting material distributor and then fed via the starting material feed conduit 25 to the starting material distributor 7. The mixing of the components can be carried out by means of any mixing device known to those skilled in the art, as have now already been used for apparatuses for the analysis of reactions having a plurality of reactors connected in parallel.

In the embodiment depicted in FIG. 2, a restrictor 19 and an exit pressure regulator 21 as pressure regulator are installed in each connecting conduit 5 between the reactor 3 and the starting material distributor 7. An essentially equal volume flow from the starting material distributor 7 to the reactors 3 is produced by the restrictor 19. For this purpose, a pressure drop which is greater than the pressure drop in the pipes and the other plant parts located upstream of the restrictor 19 in the flow direction of the starting materials starting from the distributor 7 and downstream as far as the pressure maintenance is produced in the restrictor 19. The pressure of the stream of material fed via the starting material distributor 7 through the connecting conduit 5 is set individually by means of the exit pressure regulator 21 before entry into the restrictor 19. For this purpose, the exit pressure regulator 21 is located between the starting material distributor 7 and the restrictor 19. The setting of the pressure in the stream of material before entry into the restrictor 19 enables the exact volume flow of the stream of material to be set on the basis of the known flow resistance in the restrictor 19. For this purpose, a pressure measurement is carried out between the pressure regulator 33 of the exit pressure regulator 21 and the restrictor 19 and if the measured pressure differs from a prescribed intended value, the pressure regulator 33, preferably a valve, is open further or closed in order to adjust the pressure. When the pressure measured between the restrictor 19 and the pressure regulator 33 is lower than the desired intended value, the pressure regulator is closed further in order to reduce the pressure and correspondingly is opened in the case of a measured pressure which
is higher than the desired intended value in order to lower the pressure in the connecting conduit 5 upstream of the restrictor 19. In this way, it is possible always to feed the stream of material into the restrictor 19 with essentially the same pressure, so that the volume flow which is supplied to the reactor 3 remains constant. As an alternative, it is of course also possible, if this is desirable for the reaction to be examined, to vary the volume flow, in which case the prescribed intended value for the pressure in the stream of material before entry into the restrictor 19 is varied in accordance with the desired volume flow.

In the alternative embodiment depicted in FIG. 3, the pressure regulator 33 is positioned between the restrictor 19 and the reactor 3. In this case, the use is made of an admission pressure regulator 23 in which the pressure of the stream of material leaving the restrictor 19 is measured. On the basis of the pressure measured at the exit from the restrictor 19, the pressure regulator 33 is then set in order to obtain a prescribed pressure on the outlet side of the restrictor 19. In this way, the volume flow of the stream of material fed to the reactor 3 can then likewise be set.

Figure 4:
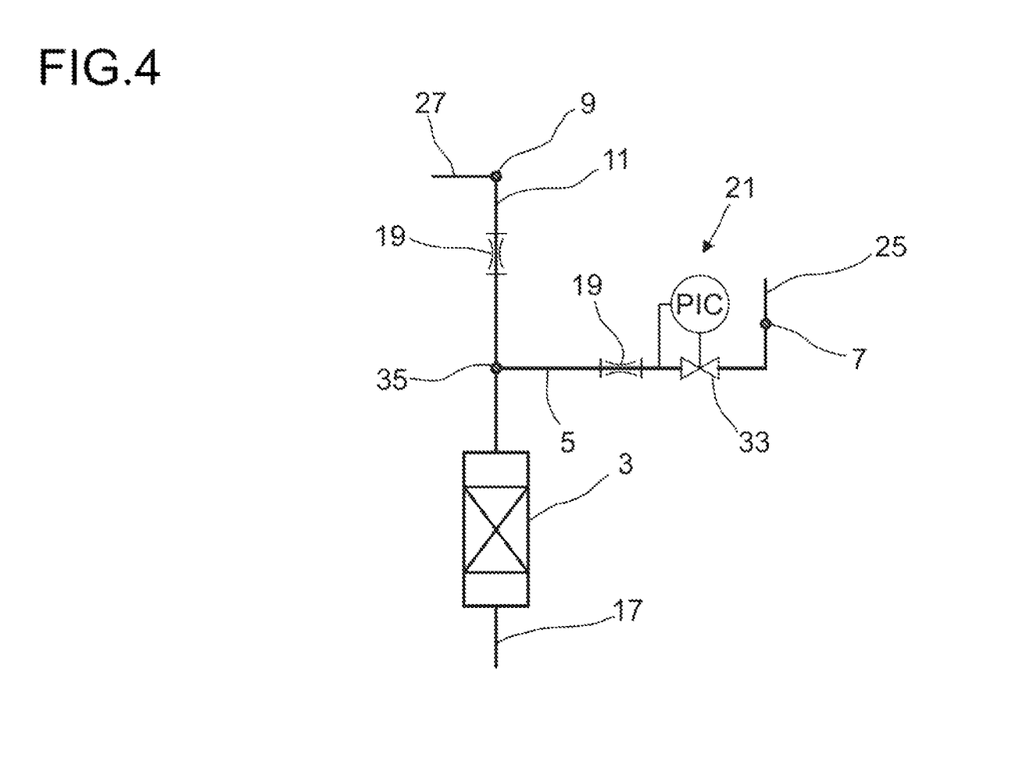

FIG. 4 shows an embodiment having a starting material distributor and a further distributor for introduction of starting materials or inert gases.

In contrast to the embodiments depicted in FIGS. 2 and 3, the embodiment depicted in FIG. 4 additionally comprises a further distributor 9 which is connected by means of a further connecting conduit 11 to the reactor 3, with the further connecting conduit 11 opening into the connecting conduit 5 at a connecting point 35 in the embodiment illustrated here.

The further distributor 9 can be connected without a restrictor or pressure regulator. However, a preferred alternative is also to provide a restrictor in the further connecting conduit 11. In addition, it is also possible to provide a pressure regulator, in which case both the volume flow of the stream of material fed in via the starting material distributor 7 and the volume flow of the stream of material fed in via the further distributor 9 can be set exactly. When no starting material but instead an inert gas as diluent gas is introduced via the further distributor 9, it is generally sufficient to provide a restrictor 19.

For precise setting of the volume flow, a restrictor 19 and a pressure regulator 33 are installed in the connecting conduit 5. Here, the pressure regulator can, as shown here, be arranged between the starting material distributor 7 and the restrictor 19. However, it is also possible as an alternative for the pressure regulator 33 to be arranged, as shown in FIG. 3, between the restrictor 19 and the reactor 3, in which case the pressure regulator 33 is preferably an admission pressure regulator.

When a pressure regulator is additionally provided in the further connecting conduit 11, this can likewise be positioned, as shown in FIGS. 2 and 3, either upstream of the restrictor or downstream of the restrictor; here too, an exit pressure regulator is used in the case of arrangement upstream of the restrictor and an admission pressure regulator is used in the case of positioning downstream of the restrictor.

When a pressure regulator 33 is provided only between the starting material distributor 7 and the reactor 3 and no pressure regulator is positioned in the further connecting conduit 11 between the further distributor 9 and the reactor 3, it is also possible to feed in the starting materials not via the starting material distributor 7 but instead via the further distributor 9 and, for example, introduce a diluent gas via the starting material distributor 7. However, the starting materials are usually conveyed via the distributor 7 and/or 9, in which case the flow of material can be set exactly. Introducing the starting materials via the further distributor 9 and a gas containing a moderator via the distributor 7 is preferred when the influence of the amount of moderator on the reaction is to be examined.

When starting materials are fed in both via the starting material distributor 7 and also the further distributor 9, particular preference is given to a restrictor 19 and a pressure regulator 33 being installed in each case in the connecting conduit 5 between starting material distributor 7 and reactor 3 and in the further connecting conduit 11 between further distributor 9 and reactor 3.

In the embodiments depicted in FIGS. 2, 3 and 4, there is no outlet conduit for branching off part of the starting material provided. However, depending on the reaction to be carried out, an outlet conduit as shown in FIG. 1 can also be provided. When the apparatus is to be used for examining different reactions, it is also possible to provide an additional valve in the outlet conduit 13 so that the conduit can be closed by means of this valve when no starting material is to be discharged from the apparatus via the outlet conduit 13.

Figure 5:
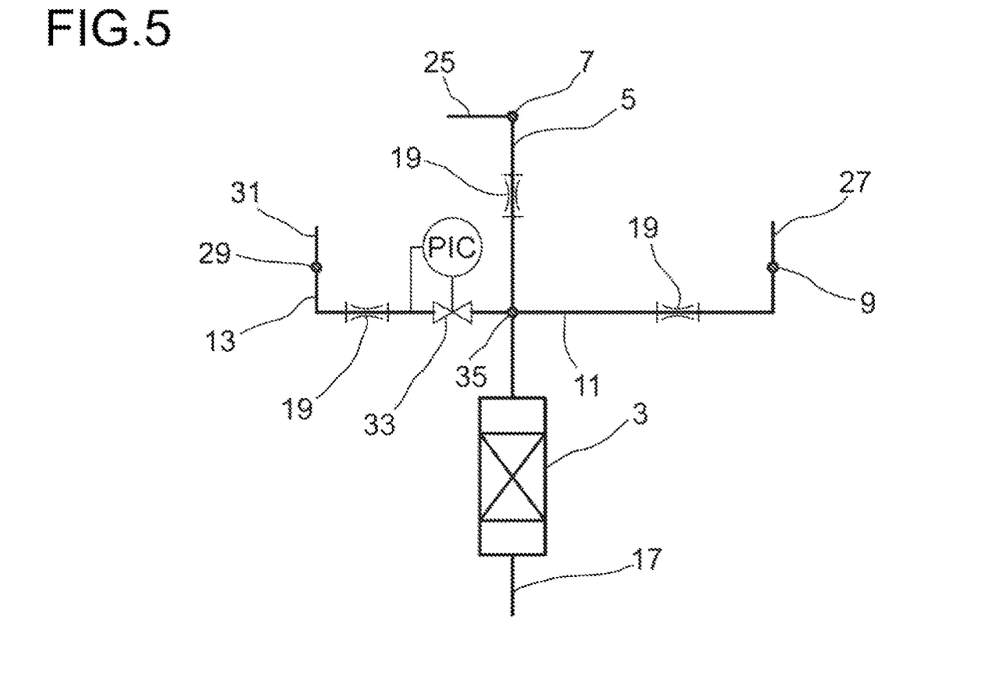

A further alternative embodiment is depicted in FIG. 5. In contrast to the embodiments depicted in FIGS. 2, 3 and 4, the stream of material fed into the reactor 3 is set by setting the stream of material taken off via the outlet conduit 13 in the embodiment depicted in FIG. 5. For this purpose, the restrictor 19 and the pressure regulator 33 are installed in the outlet conduit 13. Preference is given to there being a restrictor and no pressure regulator in the connecting conduits 5, 11 between the starting material distributor 7 and the reactor 3 and, if present, between the further distributor 9 and the reactor 3, as shown here.

In this embodiment, the setting of the stream fed to the reactor 3 is carried out not directly but instead indirectly by setting of the stream of material which is taken off through the outlet conduit 13. For this purpose, the pressure regulator 33 is positioned in the outlet conduit 13 between the reactor 3 and the restrictor 19, with the pressure regulator 33 here being an exit pressure regulator. The stream of material which has not been fed to the reactor 3 can be determined from the pressure measured in the outlet conduit 13 before entry into the restrictor 19, so that the stream of material fed to the reactor 3 can in this way be set with the aid of the pressure in the outlet conduit 13. As an alternative to the embodiment depicted in FIG. 5, it is also possible to use an admission pressure regulator for setting the stream of material, in which case this is positioned downstream of the restrictor 19 in the flow direction.

Figure 6:
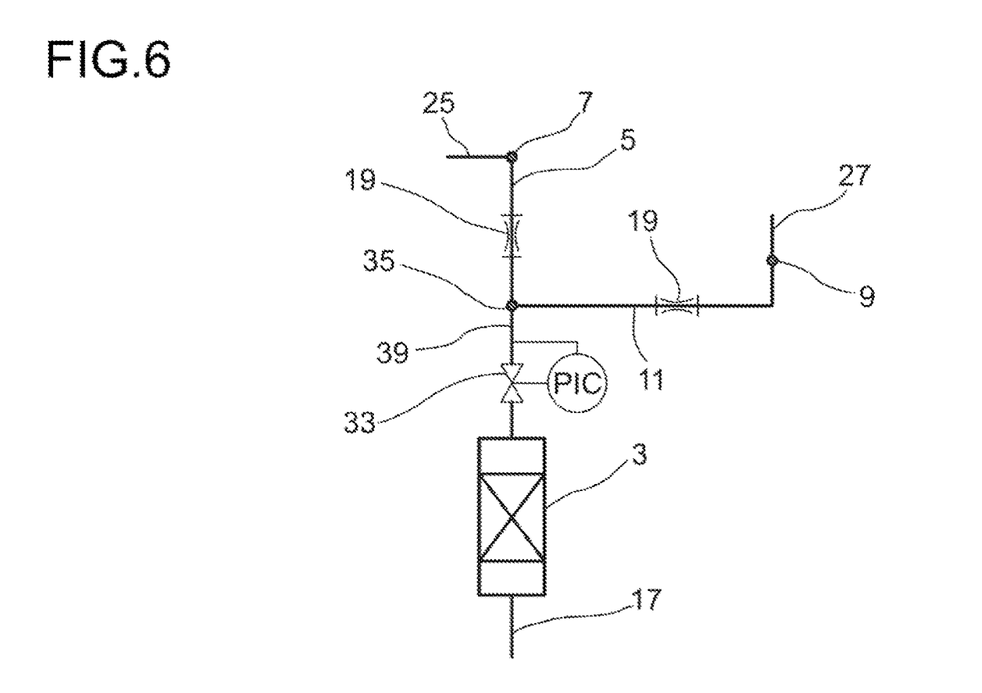

FIG. 6 shows a further embodiment of a reactor of an apparatus for analyzing reactions having two starting material feed conduits. In contrast to the embodiments shown in FIGS. 4 and 5, the pressure regulator 33 here is not installed in the connecting conduit 5 or 11 but instead in a joint feed conduit 39 upstream of the reactor 3 and, in the flow direction of the fluids, downstream of the connecting point 35 at which the connecting conduit 5 and the further connecting conduit 11 are brought together. As in FIG. 5, an outlet conduit 13 is also possible here, but depending on the experiments to be carried out and the streams of material fed in is not always necessary. In the case of more than two starting material streams, it is also possible for further starting material distributors and connecting conduits from the starting material distributors to the reactor or to the connecting point 35 to be present, but these are not shown here. In the embodiment depicted in FIG. 6, too, an inert gas can be introduced instead of a further starting material via one of the connecting conduits 5, 11. Particularly when changes in the partial pressure do not have any influence on the reaction carried out in the reactor, it is possible to dispense with a restrictor, at least in the connecting conduit through which the inert gas is fed in.

Figure 7:
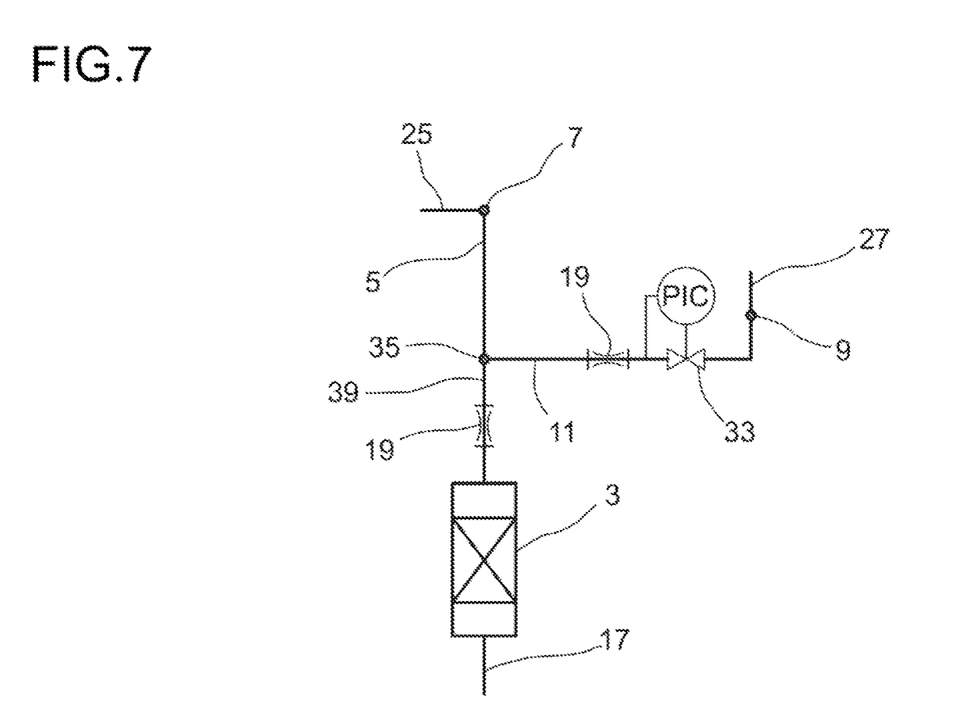

FIG. 7 shows a further embodiment of a reactor of an apparatus for analyzing reactions having two starting material feed conduits. In contrast to the embodiment depicted in FIG. 4, the restrictor 19 is positioned in the joint feed conduit 39 in the embodiment depicted in FIG. 7. This embodiment requires a smaller volume flow to be fed in via the further connecting conduit 11 than the maximum amount that can flow through the joint feed conduit 39, so that no backflow into the connecting conduit 5 occurs. An advantage of this embodiment is that the total flow remains essentially constant at the same or comparable viscosity of the streams from the distributor 7 and the further distributor 9 through the feed conduit 39 and only the composition of the total stream changes when the amount introduced via the further connecting conduit 11 is altered.

EXAMPLES

In a test setup having three parallel individual introduction trains analogous to that depicted in FIG. 3, an individual flow regulator was examined. By means of an exit pressure regulator upstream of the starting material distributor, the pressure $p_1$ was produced in the starting material distributor by introducing appropriate amounts of nitrogen from the exit pressure regulator upstream of the starting material distributor. The installation of actual reactors was omitted and the respective outflow from the partial system was measured as a function of time using a mass flow meter. A capillary having a length L and an internal diameter ID was in each case installed as restrictor in the individual introduction train (analogous to connecting conduits 5 to the reactor in FIG. 3) and an admission pressure regulator (manufacturer: "Pressure Control Solutions"; model: LF1SNN12B-NSMP1000T150G10VVB/Equilibar LF Series Precision Back Pressure Regulator) was installed downstream in the flow direction. The individual pressure downstream of the restrictor produced by this admission pressure regulator will hereinafter be referred to as $p_2$. For individual experiments, a further admission pressure regulator (same Equilibar from Pressure Control Solutions) was installed at the outlet of the introduction train in order to examine the effect of a non-atmospheric reactor pressure. This pressure will hereinafter be referred to as $p_3$ and will be given as 0 bar g for experiments without this additional admission pressure regulator.

For experiments on individual gas introduction, the corresponding pressure p1 was generated by means of nitrogen. The following experiments were carried out using capillaries having a length of 1 m and a nominal internal diameter of 80 μm as restrictor at room temperature (23-24° C.). $p_0$ is ambient pressure. p-term designates the term: $(p_1^2-p_2^2)/p_0$.

TABLE 1

Study on individual flow metering of nitrogen

| Capillary/ introduction train # | $p_1$ [bar(g)] | $p_2$ [bar(g)] | $p_3$ [bar(g)] | $p_0$ [bar a] | p-term [bar] | Volume flow of nitrogen [mln/h] | Volume flow/ p-term [mln/bar/h] | Re [—] |
|---|---|---|---|---|---|---|---|---|
| 1 | 8.97 | 0.00 | 0.00 | 1.01 | 97.70 | 53.36 | 0.55 | 977 |
| 1 | 11.01 | 0.00 | 0.00 | 1.01 | 141.98 | 70.83 | 0.50 | 1297 |
| 1 | 12.97 | 0.00 | 0.00 | 1.01 | 192.48 | 88.33 | 0.46 | 1617 |
| 1 | 25.04 | 24.72 | 0.00 | 1.01 | 16.08 | 10.20 | 0.63 | 187 |
| 1 | 25.06 | 23.06 | 0.00 | 1.00 | 100.35 | 52.34 | 0.52 | 958 |
| 1 | 25.05 | 21.01 | 0.00 | 1.00 | 193.53 | 87.87 | 0.45 | 1609 |
| 1 | 25.02 | 24.70 | 15.00 | 1.01 | 16.67 | 11.37 | 0.68 | 208 |
| 1 | 24.99 | 23.14 | 0.00 | 1.01 | 91.82 | 51.04 | 0.56 | 934 |
| 1 | 24.99 | 23.24 | 15.00 | 1.01 | 87.03 | 49.43 | 0.57 | 905 |
| 1 | 24.92 | 20.68 | 0.00 | 1.01 | 199.43 | 90.85 | 0.46 | 1663 |
| 1 | 24.92 | 20.64 | 15.00 | 1.01 | 200.99 | 91.03 | 0.45 | 1666 |
| 2 | 25.02 | 24.72 | 15.00 | 1.01 | 15.37 | 10.18 | 0.66 | 186 |
| 2 | 24.99 | 23.19 | 0.00 | 1.01 | 89.30 | 51.22 | 0.57 | 938 |
| 2 | 24.99 | 23.23 | 15.00 | 1.01 | 87.59 | 51.59 | 0.59 | 944 |
| 2 | 24.92 | 20.74 | 0.00 | 1.01 | 196.93 | 92.03 | 0.47 | 1685 |
| 2 | 24.92 | 20.70 | 15.00 | 1.01 | 198.37 | 91.49 | 0.46 | 1675 |
| 2 | 8.96 | 0.00 | 0.00 | 1.01 | 97.48 | 54.63 | 0.56 | 1000 |
| 2 | 10.98 | 0.00 | 0.00 | 1.01 | 141.58 | 72.31 | 0.51 | 1324 |
| 2 | 13.01 | 0.00 | 0.00 | 1.01 | 193.80 | 90.63 | 0.47 | 1659 |
| 2 | 25.04 | 24.76 | 0.00 | 1.01 | 13.97 | 9.39 | 0.67 | 172 |
| 2 | 25.06 | 23.10 | 0.00 | 1.00 | 98.41 | 51.31 | 0.52 | 939 |
| 2 | 25.05 | 21.05 | 0.00 | 1.00 | 192.10 | 89.55 | 0.47 | 1639 |
| 3 | 8.94 | 0.00 | 0.00 | 1.01 | 97.15 | 53.99 | 0.56 | 988 |
| 3 | 11.02 | 0.00 | 0.00 | 1.01 | 142.20 | 72.12 | 0.51 | 1320 |
| 3 | 13.02 | 0.00 | 0.00 | 1.01 | 194.02 | 90.04 | 0.46 | 1648 |
| 3 | 25.04 | 24.75 | 0.00 | 1.01 | 14.87 | 9.70 | 0.65 | 178 |
| 3 | 25.06 | 23.11 | 0.00 | 1.00 | 97.98 | 50.66 | 0.52 | 927 |
| 3 | 25.05 | 21.02 | 0.00 | 1.00 | 193.16 | 89.14 | 0.46 | 1632 |

The deviation of the flow regulation was 0.1% of the respective flow. Only at large pressure differences of the admission pressure regulator for $p_2$, i.e. large pressure difference $p_2$ and $p_3$, could deviations in the flow regulation of max. 1% be observed.

For experiments on n-hexadecane flow regulation, a 100 ml vessel which was filled with n-hexadecane was integrated into the inflow conduit of the starting material distributor. For the duration of the experiment, this filled vessel was pressurized with nitrogen, with regulation being effected by means of the existing exit pressure regulator. The liquid streams from the individual introduction trains were conveyed into sample containers which were weighed before and after the experiment. The corresponding mass flow conveyed was determined by measuring the introduction time and converted into a volume flow with the aid of the density.

The following experiments were carried out using capillaries having a length of 3 m and a nominal internal diameter of 127 μm at room temperature (23-24° C.).

up to 200° C.) which have been vaporized under high pressures or mixtures comprising vaporized water and having high water vapor partial pressures).

TABLE 2

Study on individual flow metering of n-hexadecane

| Capillary/ introduction train # | $p_1$ [bar(g)] | $p_2$ [bar(g)] | $p_3$ [bar(g)] | Delta p [bar] | Volume flow of n-hexadecane [ml/h] | Volume flow/ Delta p [ml/bar/h] |
|---|---|---|---|---|---|---|
| 1 | 12.02 | 5.76 | 0 | 6.26 | 0.051 | 8.09E−03 |
| 1 | 12.05 | 8.86 | 0 | 3.19 | 0.025 | 7.88E−03 |
| 1 | 30.06 | 17.97 | 0 | 12.09 | 0.089 | 7.32E−03 |
| 1 | 30.12 | 18.10 | 0 | 12.02 | 0.088 | 7.28E−03 |
| 1 | 29.96 | 17.88 | 0 | 12.08 | 0.090 | 7.47E−03 |
| 1 | 30.07 | 24.02 | 0 | 6.05 | 0.049 | 8.07E−03 |
| 1 | 30.01 | 24.12 | 0 | 5.895 | 0.048 | 8.10E−03 |
| 1 | 30.60 | 21.04 | 0 | 9.56 | 0.071 | 7.45E−03 |
| 1 | 30.02 | 17.81 | 0 | 12.205 | 0.090 | 7.35E−03 |
| 1 | 30.00 | 18.00 | 0 | 12 | 0.088 | 7.35E−03 |
| 1 | 30.00 | 18.22 | 0 | 11.78 | 0.087 | 7.36E−03 |
| 2 | 12.02 | 5.76 | 0 | 6.26 | 0.050 | 7.94E−03 |
| 2 | 12.05 | 8.73 | 0 | 3.315 | 0.026 | 7.81E−03 |
| 2 | 30.06 | 17.99 | 0 | 12.07 | 0.088 | 7.31E−03 |
| 2 | 30.12 | 18.12 | 0 | 12 | 0.087 | 7.25E−03 |
| 2 | 29.96 | 17.87 | 0 | 12.09 | 0.090 | 7.42E−03 |
| 2 | 30.07 | 24.04 | 0 | 6.035 | 0.048 | 7.99E−03 |
| 2 | 30.01 | 24.09 | 0 | 5.925 | 0.047 | 7.94E−03 |
| 2 | 30.60 | 21.00 | 0 | 9.595 | 0.071 | 7.36E−03 |
| 2 | 30.02 | 17.83 | 0 | 12.185 | 0.089 | 7.32E−03 |
| 2 | 30.00 | 18.01 | 0 | 11.985 | 0.087 | 7.30E−03 |
| 2 | 30.00 | 18.19 | 0 | 11.805 | 0.086 | 7.27E−03 |
| 3 | 12.02 | 5.99 | 0 | 6.035 | 0.048 | 7.97E−03 |
| 3 | 12.05 | 8.82 | 0 | 3.225 | 0.024 | 7.58E−03 |
| 3 | 30.06 | 17.93 | 0 | 12.125 | 0.086 | 7.08E−03 |
| 3 | 30.12 | 18.10 | 0 | 12.025 | 0.085 | 7.03E−03 |
| 3 | 29.96 | 17.87 | 0 | 12.09 | 0.087 | 7.17E−03 |
| 3 | 30.07 | 24.04 | 0 | 6.035 | 0.048 | 7.92E−03 |
| 3 | 30.01 | 24.10 | 0 | 5.91 | 0.046 | 7.85E−03 |
| 3 | 30.60 | 21.06 | 0 | 9.535 | 0.069 | 7.28E−03 |
| 3 | 30.02 | 17.82 | 0 | 12.2 | 0.088 | 7.24E−03 |
| 3 | 30.00 | 18.06 | 0 | 11.94 | 0.085 | 7.15E−03 |
| 3 | 30.00 | 18.24 | 0 | 11.76 | 0.084 | 7.11E−03 |

It is clear from the experimental examples that the flow dependence on the admission and exit pressure for a capillary (here length=3 m and internal diameter=125 μm, or 1 m and 80 μm) as restrictor element can surprisingly be described very well by the known physical relationships for compressible media (ideal gases; here nitrogen) and incompressible media (ideal liquids; here n-hexadecane) for flows in the laminar flow regime. A consequence of this is that, proceeding from an initial value, it is possible to predict the required admission and exit pressures for a desired flow directly, without substance-specific or mixture-specific properties such as temperature dependence of the viscosity having to be known. A further advantage is that the regulation qualities given by the pressure regulation and measurement, so that in the case of the regulation quality being too low, an improved regulation quality can be achieved by increasing the flow resistance of the restrictor (for example lengthening of a capillary) and correspondingly increasing the difference between admission pressure and exit pressure.

Since the individual regulation of the flow occurs by control of the admission or exit pressure at the restrictor by means of the pneumatic conduits and no electronic components have to be present, for example for flow measurement, the setup can be operated at very high temperatures, so that individual flow regulation is also possible for mixtures having very high dew points (for example hydrocarbon mixtures having an intermediate boiling range (for example Likewise, the experimental examples have surprisingly shown that not only large flow changes by a factor of 10 but also small changes in the flow by 1% are possible in a pilot plant setup.

A further aspect is that pressure changes can occur effectively ad hoc over time, while temperature changes are limited in time by the thermal mass of the respective setup and heat removal and introduction.

LIST OF REFERENCE NUMERALS

1 Apparatus for analyzing reactions
3 Reactor
5 Connecting conduit
7 Starting material distributor
9 Further distributor
11 Further connecting conduit
13 Outlet conduit
15 Catalyst bed
17 Offtake conduit
19 Restrictor
21 Exit pressure regulator
23 Admission pressure regulator
25 Starting material feed stream
27 Further feed stream
29 Collector
31 Outlet channel 33 Pressure regulator
35 Connecting point
37 Analysis unit
39 Joint feed conduit

The invention claimed is:

1. An apparatus for analyzing reactions, comprising a starting material distributor and at least two reactors which are connected in parallel and are each connected via a connecting conduit to an outlet of the starting material distributor, wherein a pressure regulator and a restrictor are installed in each connecting conduit between the starting material distributor and the reactors in order to set the inflow or wherein a restrictor and a pressure regulator are installed in an outlet conduit which branches off from each connecting conduit.

2. The apparatus according to claim 1, wherein the pressure regulator is an exit pressure regulator and is installed between the starting material distributor and the restrictor.

3. The apparatus according to claim 1, wherein the pressure regulator is an admission pressure regulator and is installed between the restrictor and the reactor.

4. The apparatus according to claim 1, wherein the restrictor is a capillary, a microstructured component, an orifice plate or a nozzle.

5. The apparatus according to claim 1, wherein the reactors are connected to a further distributor.

6. The apparatus according to claim 5, wherein a restrictor is positioned between the further distributor and each reactor.

7. The apparatus according to claim 5, wherein a pressure regulator is installed between the further distributor and each restrictor or between each restrictor located downstream of the further distributor and the reactor.

8. The apparatus according to claim 5, wherein the starting material distributor and the further distributor are each connected by means of a connecting conduit to the reactor, where the connecting conduits are brought together as a connecting point and a joint feed conduit which opens into the reactor branches off from the connecting point and the pressure regulator is installed in the joint feed conduit.

9. The apparatus according to claim 8, wherein a restrictor is installed in the connecting conduit.

10. A method for analyzing reactions in an apparatus according to claim 1, in which starting materials are fed into each reactor via the starting material distributor, wherein the flow of the starting materials is regulated by means of the pressure regulators and evaluation of the reaction product from each reactor is carried out in an analysis unit.

11. The method according to claim 10, wherein at least one starting material is fed in via the starting material distributor and at least one further starting material is fed in via the further distributor.

12. The method according to claim 10, wherein starting materials are fed in via the starting material distributor and diluent gases or gases comprising moderators are fed in via the further distributor.

13. The method according to claim 10, wherein each reactor is charged with a catalyst to be examined.

14. The method according to claim 10, wherein the reactors are supplied with different volume flows of starting material and/or different partial pressures and/or different compositions and/or different pressures.

15. The method according claim 10, wherein the reactors are all supplied with the same volume flow and subjected to the same pressure.

16. An apparatus for analyzing reactions, comprising a starting material distributor and at least two reactors which are connected in parallel and are each connected via a connecting conduit to an outlet of the starting material distributor, wherein a pressure regulator and a restrictor are installed in each connecting conduit between the starting material distributor and the reactors in order to set the inflow.

* * * * *